July 12, 1960 B. G. E. STIFF 2,944,842
VACUUM-TIGHT FLANGED PIPE COUPLING
Filed April 9, 1953

INVENTOR *Bernard G.E. Stiff*
BY
*Emery, Booth, Townsend, Miller and Heidrich* ATT'YS

United States Patent Office 2,944,842
Patented July 12, 1960

2,944,842
VACUUM-TIGHT FLANGED PIPE COUPLING

Bernard G. E. Stiff, North Reading, Mass., assignor to High Voltage Engineering Corporation, Cambridge, Mass., a corporation of Massachusetts Filed Apr. 9, 1953, Ser. No. 347,763

1 Claim. (Cl. 285—368)

This invention relates to vacuum-tight couplings between the various components of a vacuum system, and in particular to a simple vacuum-tight joint comprising essentially a set of parts, which I call a "union," and which may be readily attached to the components to be joined in accordance with the method of my invention, without any welding, brazing, soldering or similar operation, so that the vacuum-tight joint may be easily assembled or dismantled.

Figure 1:
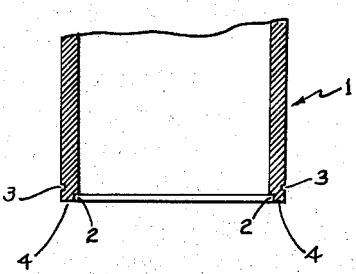
Fig. 1 is a view in longitudinal cross-section of a pipe termination which has been machined in accordance with the method of my invention.

My invention is useful primarily in connection with vacuum systems which comprise a series of components or units wherein a high degree of vacuum must be maintained, but wherein it is frequently necessary to remove or replace some or all of such components. Such vacuum systems are generally required, for example, in apparatus for the acceleration of charged particles to high energy, since the acceleration tube and tube extension assemblies, or other apparatus through which the charged particles travel, must be evacuated to pressures as low as $1 \times 10^{-6}$ millimeters of mercury. Some portions of the vacuum system, such as the acceleration tube, may be surrounded by an insulating gas under pressure, so that some couplings may have to support an external pressure as high as 400 pounds per square inch in addition to the internal vacuum.

My invention is not limited to any particular range of pressures, and throughout the present specification and claims the terms "vacuum-tight coupling," "vacuum-tight joint" and "vacuum-tight seal" refer to a coupling, joint or seal separating an enclosed gaseous region from an external gaseous region, said enclosed gaseous region exerting the lesser pressure, said coupling, joint or seal being able to withstand or sustain a differential pressure at least as great as that sustainable by the components coupled thereby.

A tube extension assembly alone may consist of several gate-valves, a vacuum gauge, a beam-defining unit, and a beam-analyzing chamber, in addition to several sections of pipe. Since a defective unit may need replacement, or it may be desired to substitute different components, the couplings between the various components must be not only vacuum-tight, but should also be adapted for quick and easy dismantling and reassembly. Furthermore, all such couplings in any one vacuum system should preferably be identical, so that one type of component may be replaced by a different type of component. Moreover, such couplings should be symmetrical and reversible, so that any component may be oriented in either direction.

Components of such a vacuum system have commonly been coupled by welding a flange to each of the pipe terminations of the components to be joined, machining a gasket groove in the end surface of one or both flanges, inserting a gasket in such groove or grooves, and bolting the flanges together. Such gasket groove generally must be machined in the end surface of the flange, since the wall-thickness of standard pipe and standard welding fittings is in general too small to permit machining a gasket groove in the end thereof. The weldment between the flange and the pipe termination must therefore be vacuum-tight. Owing to the possible porosity of the weldment, it must be checked for leaks, and such checking is expensive and time-consuming. Furthermore, it is necessary that each flange be of the same material as that of its respective pipe termination, in order that it may be properly welded thereto.

My invention comprehends constructing a gasket groove upon the end surfaces of the pipe terminations to be joined, instead of machining it out of the surface of the flange. By so doing, I am able to couple sections of standard pipe, properly terminated, standard welding fittings, appropriately machined, and the like, without the necessity of welding the flanges to the pipe terminations.

Referring more particularly to the drawing, and first to Fig. 1 thereof, therein is shown a pipe termination 1 which has been machined in accordance with my invention. Said pipe termination 1 may be provided at the end of any standard metal pipe or welding fitting, which may be of any suitable metallic material, such as iron, steel, stainless steel, aluminum, or mild steel, and which may be of any convenient diameter, for example, between one-half inch and twenty-four inches. My invention is not limited to any particular material or size of metal pipe, but may be used to advantage with any available standard metal pipe or welding fitting.

In accordance with my invention, an annular seat 2 is bored or machined in the inner surface of the pipe termination 1 at the end thereof. An annular groove 3 is machined or cut in the outer surface of the pipe termination 1 a short distance from the end surface 4 thereof. The end surface 4 of the pipe 1 is faced flat and smooth by machining on a lathe or by surface grinding.

Various devices which are used in connection with vacuum systems, such as gate valves, vacuum gauges, beam-deflecting units, beam-defining units, beam-analyzing chambers, bellows, T's, elbows, roughing valve inserts, and the like may be adapted to be coupled to one another in accordance with my invention by providing them with pipe terminations of the type shown in Fig. 1. In addition, any standard pipe or welding fitting having such a pipe termination may be blanked off by coupling thereto a blank-off flange 10 such as that shown in Fig. 2, which consists essentially of a metal disk provided with the pipe termination shown in Fig. 1.

Figure 4:
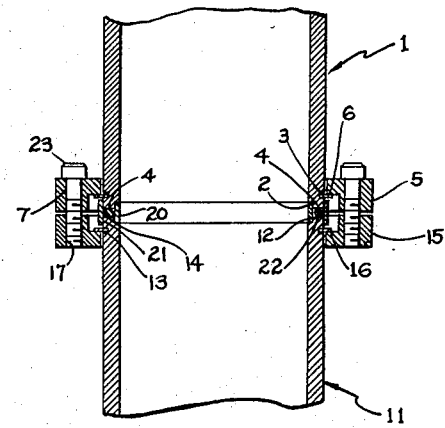
Fig. 4 is a similar view of the apparatus of Fig. 3 after the pipe terminations have been coupled in accordance with my invention.
Figure 3:
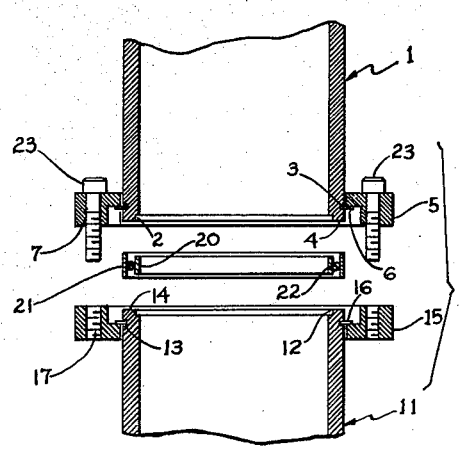
Fig. 3 is a similar view of a pair of pipe terminations together with a set of parts, or "union," for forming a vacuum-tight coupling therebetween in accordance with my invention.

Any section of standard metal pipe, standard welding fitting, or similar device having a pipe termination as shown in Fig. 1 may be hermetically joined to any other such pipe, welding, fitting, or similar device in accordance with my invention by means of the set of parts or "union" shown in Figs. 3 and 4 and comprising: two flange members 5, 15, two snap-rings 6, 16, two hard rings 20, 21, a compressible annulus 22, and a number, such as six, of bolts 23. The two pipe terminations 1, 11 should have the same cross-sectional dimensions, but may be of different metallic material.

The vacuum-tight coupling shown in Figs. 3 and 4 may be assembled in the following manner. Referring to Fig. 3, flange members 5, 15 are slidably fitted over the two pipe terminations 1, 11 respectively, and snap-rings 6, 16 are inserted in the annular grooves 3, 13 respectively. A hard inner ring 20 is then placed in the annular seat 12 (see Fig. 4) of the lower pipe termination 11, and a compressible annulus 22, such as a gasket or O-ring, is dropped into place over the inner ring 20 and upon the end surface 14 of the lower pipe termination 11. A hard outer ring 21 is then placed about the compressible annulus 22, and the upper pipe termination 1 is fitted in place, as shown in Fig. 4.

The flange members 5, 15, which abut against the snap-rings 6, 16, are then drawn together, as by tightening threaded bolts 23, which pass through apertures 7 in flange member 5, and screw into threaded sockets or holes 17 in flange member 15. My invention is not limited to any particular means for drawing the flange members 5, 15 together.

As the flange members 5, 15 are drawn together, the pipe terminations 1, 11 are clamped tightly against the hard inner ring 20. At the same time, the compressible annulus 22 is compressed against the four surfaces which surround it, namely, the end surfaces 4, 14 of the pipe terminations 1, 11 respectively, the inner ring 20, and the outer ring 21, as shown in Fig. 4. However, the compressible annulus 22, and an O-ring in particular, may be damaged if the pressure thereon is excessive, and hence the axial dimension of the inner ring 20 is so related to the sum of the axial dimensions of the annular seats 2, 12 and the cross-sectional dimension of the compressible annulus 22, that the two pipe terminations 1, 11, when bolted together, are limited in their travel by stopping on the hard inner ring 20, and the maximum pressure on the compressible annulus 22 is limited to a pressure sufficiently great to provide a vacuum-tight seal between the compressible annulus 22 and the end surfaces 4, 14 of the pipe terminations 1, 11, but not so great as to damage said compressible annulus 22. For example, if an O-ring with a .138-inch cross-sectional diameter is employed, the distance between the end surfaces 4, 14 of the pipe terminations 1, 11 should be .095-inch when the pipe terminations 1, 11 stop on the hard inner ring 20.

The inner and outer rings 20, 21 may be of any hard material, preferably metal. Said rings 20, 21 may be cut, for example, from pieces of tubing. When the vacuum-tight coupling forms part of an evacuated conduit through which charged particles travel at high energy, it is particularly desirable that the inner surface of such conduit, including the vacuum-tight coupling, be smooth and metallic in order to minimize the effects of bombardment by such charged particles. In such cases, the inner ring 20 preferably fits snugly in the annular seats 2, 12, with its inner diameter substantially the same as that of the components abutting against it.

The compressible annulus 22 may be a gasket or O-ring of any compressible material, such as rubber, lead, copper or a suitable plastic composition. Alternatively, I may use a compressible annulus comprising an annular metal tube filled with gas under high pressure, for example 2000 pounds per square inch. In general, I prefer to use O-rings rather than gaskets of rectangular or square cross-section, since the former are more available commercially.

Most of the units in the vacuum system may readily be provided with pipe terminations of the type shown in Fig. 1, and a vacuum-tight joint may be made between any two such units merely by means of a set of parts, or "union," which comprises the two flange members 5, 15, the two snap-rings 6, 16, the hard inner ring 20, the hard outer ring 21, the compressible annulus 22, and means for coupling the two flange members 5, 15 together, such as the bolts 23. No welding, brazing, soldering, or similar operation is required, and the vacuum-tight coupling may be assembled or dismantled easily and quickly.

Figure 2:
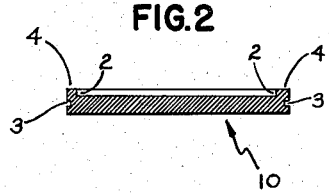
Fig. 2 is a similar view of a blank-off flange.
Figure 5:
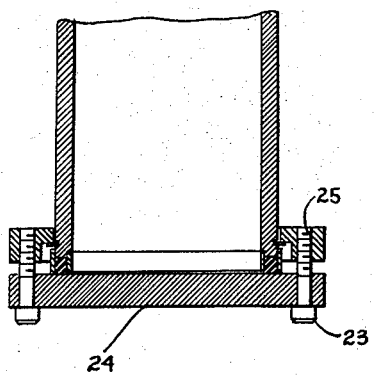
Fig. 5 is a similar view of a pipe termination which has been blanked off in accordonce with my invention, using a modified form of blank-off flange.

Any such unit may be blanked off by coupling thereto, in the manner hereinbefore described, a blank-off flange of the type shown in Fig. 2. Alternatively, any such unit may be blanked off by a blank-off flange of the type shown at 24 in Fig. 5, said blank-off flange 24 comprising a metal disk having holes or sockets 25 adapted to receive the bolts 23. In the vacuum-tight coupling of Fig. 5, the flange member 15 and the snap-ring 16 are omitted from the "union," and no annular seat or annular groove need be machined in the blank-off flange 24.

Having thus described several illustrative embodiments of the vacuum-tight joint of my invention, and the method of constructing the same, it is to be understood that although specific terms are employed, they are used in a generic and descriptive sense and not for purposes of limitation, the scope of the invention being set forth in the following claim.

I claim:

A union for joining together in a vacuum-tight manner two standard pipe terminations forming part of a vacuum system in at least a portion of which charged particles travel at energies in excess of one-half million electron volts, wherein the sole necessary alterations in each standard pipe termination are (1) a counterbore at the inner edge of each pipe termination and (2) a groove in the outer surface of each pipe termination spaced from the end surface thereof, comprising, in combination with two such standard pipe terminations each having such a counterbore and such a groove as the sole alterations therein: a snap-ring positioned in each groove, a flange member slidably fitted over each pipe termination and abutting against each snap-ring for the purpose of drawing said pipe terminations together, a compressible annulus separating the end surfaces of said pipe terminations, a hard inner ring confined by said counterbores within said compressible annulus, the internal surface of said hard inner ring lying substantially flush with that portion of the internal surface of each of said pipe terminations which adjoins said counterbores, a hard outer ring confined between said snap-rings to surround said compressible annulus and a portion of the ends of said pipe terminations, and means including said flange members and said snap-rings for clamping said pipe terminations together to provide sufficient mating pressure between the compressible annulus and the four surfaces surrounding it (namely, the end surfaces of the pipe terminations, the outer surface of the inner ring, and the inner surface of the outer ring) to form a vacuum-tight seal capable of supporting not less than atmospheric pressure outside said vacuum system and $10^{-6}$ mm. Hg inside said vacuum system, said hard inner ring serving to shield said compressible annulus from bombardment by said charged particles in order to reduce evolution of gases from said compressible annulus and to limit the longitudinal movement of said pipe terminations in order to prevent excessive deformation of said compressible annulus.

References Cited in the file of this patent

UNITED STATES PATENTS

| 101,488 | Mendham | Apr. 5, 1870 |
|---|---|---|
| 262,581 | Doolittle | Aug. 15, 1882 |
| 267,401 | Brislin | Nov. 14, 1882 |
| 813,454 | Schaad | Feb. 27, 1906 |
| 814,289 | Hawley | Mar. 6, 1906 |
| 1,242,568 | Loughridge | Oct. 9, 1917 |
| 1,821,867 | Wilson | Sept. 1, 1931 |
| 2,319,068 | Krone et al. | May 11, 1943 |
| 2,525,652 | Cunningham | Oct. 10, 1950 |
| 2,532,891 | Chupp | Dec. 5, 1950 |
| 2,574,655 | Panofsky et al. | Nov. 13, 1951 |
| 2,625,413 | Christensen | Jan. 13, 1953 |

FOREIGN PATENTS

| 177,786 | Great Britain | Mar. 29, 1922 |
|---|---|---|
| 102,807 | Australia | Dec. 20, 1937 |
| 251,481 | Switzerland | Oct. 31, 1947 |
| 644,845 | Great Britain | Oct. 18, 1950 |